United States Patent [19]

Chen

[11] Patent Number: 5,090,049
[45] Date of Patent: Feb. 18, 1992

[54] FAX MESSAGE RECORDER AND RELAY SYSTEM AND METHOD

[76] Inventor: Thomas N. Chen, 7507 Shadywood Rd., Bethesda, Md. 20817

[21] Appl. No.: 526,641

[22] Filed: May 22, 1990

[51] Int. Cl.⁵ .......................................... H04M 11/00
[52] U.S. Cl. ................................... 379/100; 379/102; 379/95; 358/400
[58] Field of Search ................. 379/100, 102, 95, 211, 379/67; 358/400, 401, 402, 407

[56] References Cited

U.S. PATENT DOCUMENTS

| | | | |
|---|---|---|---|
| 4,607,289 | 8/1986 | Kurokawa . | |
| 4,654,718 | 3/1987 | Sueyoshi . | |
| 4,785,355 | 11/1988 | Matsumoto . | |
| 4,788,714 | 11/1988 | Hashimoto . | |
| 4,794,637 | 12/1988 | Hashimoto | 379/100 |
| 4,796,091 | 1/1989 | Nohtomi . | |
| 4,893,333 | 1/1990 | Baran et al. | 379/100 |
| 4,935,955 | 1/1990 | Neudorfer | 379/100 |
| 4,941,170 | 7/1990 | Herbst | 379/100 |

OTHER PUBLICATIONS

"Multi-Media Mail System", IEICE Technical Report (Japan), Apr. 87, pp. 1-6.

Primary Examiner—James L. Dwyer
Assistant Examiner—Ahmad F. Matar
Attorney, Agent, or Firm—Kerkam, Stowell, Kondracki & Clarke

[57] ABSTRACT

A fax message record/relay device or system operates in conjunction with a local fax machine. The system allows the local fax machine to operate normally while the record/relay device simply records incoming fax messages and stores them in a memory. An authorized person may call in to the record/relay system and request that the fax messages be forwarded to a telephone number corresponding to a fax machine which the authorized person has immediate access to. The authorized person uses a password and a DTMF push button telephone in order to remotely input commands to the record/relay system.

20 Claims, 9 Drawing Sheets

FAX MESSAGE RECORDER AND RELAY SYSTEM AND METHOD

BACKGROUND OF THE INVENTION

The present invention relates to a fax message recorder and relay system and method. More specifically, the present invention relates to a system and method for forwarding fax communications.

The use of facsimile systems is now quite common. In particular, many businesses use such facsimile systems, often called fax machines, for sending and receiving text and/or graphics over a telephone line. The use of such machines allows instantaneous transfer of documents over the telephone system.

Although the documents can be transferred instantaneously, many fax machine owners do not have constant access to their machines such that communication to these people is hindered. This is especially true for those who are on the road all the time, such as salesmen. In that case, the fax machine can only work like a mail box and hold the messages until the person returns.

Among various patents which relate to the fax communications is U.S. Pat. No. 4,785,355 to Matsumoto. This patent discloses an apparatus allowing the forwarding of fax messages. A station calling the apparatus disclosed by this patent may indicate that the fax message should also be transferred to another transferred destination. Alternately, the apparatus may be preprogrammed to forward urgent calls to another telephone number at which the owner of the receiving fax may temporarily be located.

The Kurokawa U.S. Pat. No. 4,607,289 shows a fax machine which receives a fax message and stores the machine in memory. Additionally, the fax message or data is relayed to another remote fax machine designated by the originating station.

The Sueyoshi U.S. Pat. No. 4,654,718 shows a fax machine which notifies the person to whom the fax is directed by dialing his telephone number.

The Hashimoto U.S. Pat. No. 4,788,714 shows an arrangement to couple telephone answering machine operation along with other equipment such as a fax machine to the same telephone line. The arrangement is used to switch through telephone calls to the correct device and to prevent the inconvenience caused by immediate operation of all the devices connected to the same telephone line.

The Nohtomi U.S. Pat. No. 4,796,091 shows a selector type of device wherein an incoming fax message can be displayed, stored, or printed depending upon the receiver's selection.

Although the above and other devices have been somewhat useful, there remains much room for improvement. In particular, arrangements wherein the person sending the fax message can designate relay or transfer stations is of little use to a salesman who is on the road. Such an arrangement may be helpful if one wishes to send a fax to different locations of a particular company. However, someone sending a fax to a salesman or someone else on the road would not know necessarily that the person is gone and would be most unlikely to know exactly where the message should be forwarded. Those arrangements which allow a fax machine owner or operator to preprogram a forwarding destination are useful when the person knows exactly where they will be. For example, if they are going on a trip to a single destination and they have the fax number at that destination, they could preprogram that into the device. The device or system would then forward the fax message to the number which was preprogrammed. However, if the person did not know the fax number of his destination or had a large number of destinations and his schedule was subject to variation, such an arrangement wherein a preprogrammed forwarding number is left at the fax machine is not especially helpful.

From the above, it will be seen that various fax systems for relaying messages have been somewhat lacking in flexibility. A further disadvantage of numerous of those systems is that they may use an auxiliary relay device or system as the terminating device on the incoming fax message. In other words, the incoming fax message is preceded by a telephone ring signal, which ring signal is terminated when a machine "picks up" the telephone call. Generally, such relay systems provide for the relay system to pick up the telephone call in which case the local fax machine is no longer on line. This often requires complex arrangements and may hinder the production of a local hard copy of the fax message. In other words, the relay device may store the message and forward it to a prescribed location, but the local fax machine may not print out the same message absent complex arrangements.

Another problem with various fax relay systems is that they are not transparent, meaning that the sending fax exchanges protocol signals with the relay system and realizes that the relay system is not necessarily the same as the receiving fax. In other words, when the relay system is receiving a message which should be forwarded, the relay system is actively engaging in the communication process as opposed to passively watching (transparently operating) while the local fax machine receives messages from the remote or sending fax machine. The active operation of such relay systems requires further design complications if one is also going to have the relay device produce a local hard copy at the local fax machine.

OBJECTS AND SUMMARY OF THE INVENTION

Accordingly, it is a primary object of the present invention to provide a new and improved fax message recorder and relay system and method.

A more specific object of the present invention is to provide for the relay of fax messages with greater flexibility than previously provided.

A still more specific object of the present invention is to provide for the relay of fax messages wherein an authorized person may remotely control the location to which a fax message is to be forwarded.

A further object of the present invention is to provide a system for forwarding fax messages wherein the system may operate passively in a recording mode, thereby being transparent to the source of the fax message.

Yet another object of the present invention is to provide a system for fax message forwarding which allow an originating remote fax machine and a local receiving fax machine to operate without any deviation from their normal operations arising from the use of the fax message recorder/relay system.

A still further object of the present invention is to provide a relatively simple in construction and inexpensive fax message recorder/relay device.

The above and other objects of the present invention are realized by a fax message recorder and relay system including an interface with first connection means connectable to an external phone line, second connection means connectable to a interconnection phone line extending from the system to an external, local fax machine, a ring detector to detect incoming telephone calls on the external phone line, and switching means. Additionally, a fax means integral to the system is operably connected to the interface such that the fax means is operable to send and receive fax messages over the external phone line depending on the position of the switching means. A memory is operably connected to the fax means to receive and store incoming fax messages from a remote fax machine even with the local fax machine receiving messages. A controller is operably connected to the interface, the memory, and the fax means. The controller controls the switching means to allow the memory to store incoming fax messages sent over the external phone line and intended for the local fax machine and to allow retransmission of the incoming fax messages over the external phone line to a telephone number remotely set by an authorized person independently, and after reception, of any incoming fax message. The phone number to which the message is to be forwarded is "remotely set" in that it is set by the authorized person from a remote telephone. It is set independently of any incoming fax message in that the number to which the message is to be forwarded is set by a person who calls after the incoming fax message (i.e., the person and communication which sets the telephone number to which the message is to be forwarded is independent of the fax message previously sent to the local fax machine). The system operates in a recording mode for storing incoming fax messages without sending protocol signals to a remote fax machine calling on the external phone line. The system operates in the recording mode for storing the incoming fax messages without being a terminating system for the external phone line. (In other words, the system relies upon the local fax machine to pick up or answer the telephone call from the remote fax machine and does not have to pick up the telephone call itself.) The fax means includes a modem and an instruction detector and the controller selectively disposes the device in: the recording mode for storing incoming fax messages; a remote access mode in which an authorized person may, via remote telephone, input commands to the device including a forward command to forward stored fax messages to a remote fax at a number supplied by the authorized person via the remote telephone; and a forwarding mode in which the device forwards stored fax messages to the remote fax at a number supplied during the remote access mode. The controller further may selectively dispose the system in a notification mode wherein the system generates an outgoing call with a coded signal whenever an incoming fax message is stored. The switching means includes a first switch having a closed position in which the first connection means and the second connection means are connected such that signals may freely travel between the external phone line and the interconnection phone line and an open position in which the first switch blocks signals on the external phone line from reaching the interconnection phone line. The switching means includes a second switch having a closed position in which the fax means is operably connected to the external phone line and an open position in which the fax means is disconnected from the external phone line. The commands are preferably DTMF (dual tone multi-frequency) signals.

The method of the present invention may be described as a method of receiving fax messages by using a fax message recorder and relay device as discussed above and including the step of storing in the memory incoming fax messages sent to the local fax machine. The next step is calling the phone number of the external, local fax machine (which phone number is shared with the fax message recorder/relay device) from a remote telephone and sending, independent of any received fax message, a forward command to direct the system to forward fax messages to a remote location remotely set with the forward command. A further step is receiving fax messages at the remote location set when the forward command was sent. The local fax machine answers incoming fax messages, thus serving as a terminating device for an incoming fax message.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
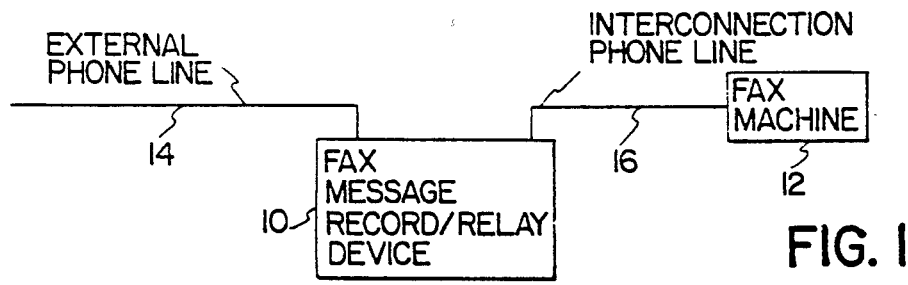
FIG. 1 shows how the system of the present invention connects between an external phone line and an ordinary fax machine.

The connection between a fax message recorder/relay device or system 10 according to the present invention and an ordinary fax machine 12 is illustrated in FIG. 1. In particular, the fax message record/relay system 10 is connected to the external phone line 14 which in turn connects to the central telephone system (not shown) and the system 10 is connected to the fax machine 12 by an interconnection phone line 16. The phone lines 14 and 16 may connect to the system 10 by using common phone plugs inserted into phone jacks (now shown), which jacks may be mounted to the back of the device or system 10. Preferably, the system 10 is encased in a single housing (not separately shown or labeled).

Before proceeding to discuss the details of construction of the system 10, a brief overview of its operation may be helpful. If someone sends a fax message from a remote fax machine (now shown) to the local fax machine 12 by way of the external phone line 14, the present device or system 10 allows the external phone line 14 to be operably connected to the interconnection phone line 16 such that the fax machine 12 operates in a normal fashion to receive the incoming message from external phone line 14. The fax machine 12 of standard construction may provide the outgoing protocol signals needed by the remote fax machine in order to establish communication. Additionally, the local fax machine 12 answers the call or "picks up" the line, meaning that the fax machine 12 closes the phone circuit.

When the incoming fax message is transmitted to the local fax machine 12 and the present system or device 10 is in a recording mode, the system 10 passively observes the communication between the remote fax machine and the local fax machine. (The system 10 controls internal switching means, discussed in detail below, which allow this direct communication between the remote fax machine and the local fax machine 12 by way of phone lines 14 and 16.) The present record/relay device or system 10 simply records the incoming fax message. The system 10 does not serve as a terminating device to the incoming phone call (in other words it does not answer or pick up the phone call) and it does not provide outgoing protocol signals to the remote sending or transmitting fax machine. Thus, at the same time as the local fax machine 12 is operating normally to produce a hard copy of the incoming message, the present system 10 stores the incoming fax message.

When the owner or operator of the fax machine 12 calls in to determine if any fax messages have been sent to his machine 12, he may request that the system 10 retransmit any stored fax message to a telephone number which he may supply remotely by use of a digital tone telephone.

Figure 2:
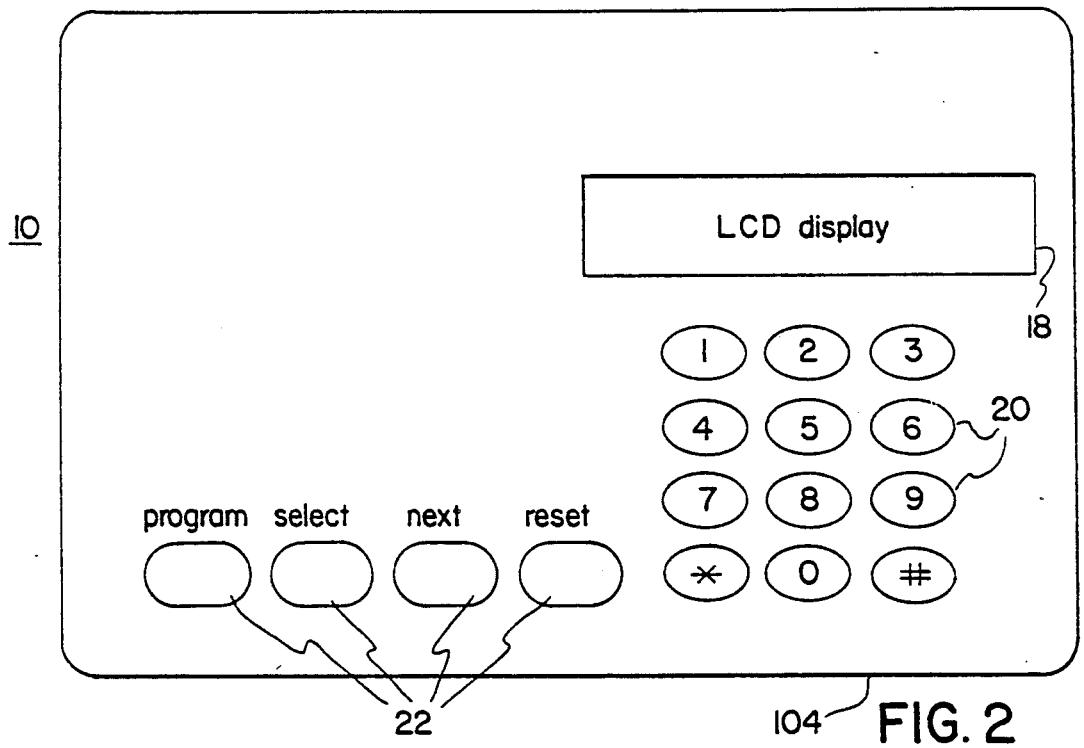
FIG. 2 shows a top view of a possible layout for the present invention.

Turning now to FIG. 2, there is shown a possible layout for the top of the housing 10H in which the system or device 10 is housed. Additionally, the top includes an LCD display 18, a key pad 20, and buttons 22 having the indicated functions.

Figure 3:
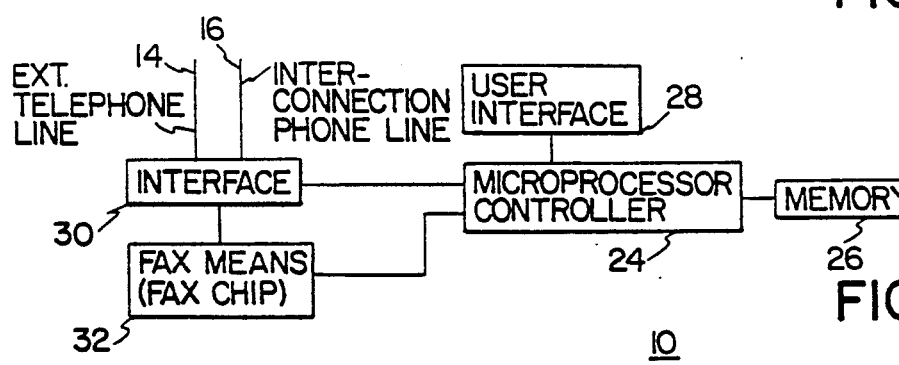
FIG. 3 shows a simplified block diagram of the system according to the present invention.

As shown in FIG. 3, the basic components of the system 10 include a controller 24, which preferably is a microprocessor, a memory 26 for storing incoming fax messages, a user interface 28, a line interface 30, and a fax means 32, such as a fax chip or fax board. In the discussion which follows, the line interface 30 will often be referred to simply as the interface.

Figure 4:
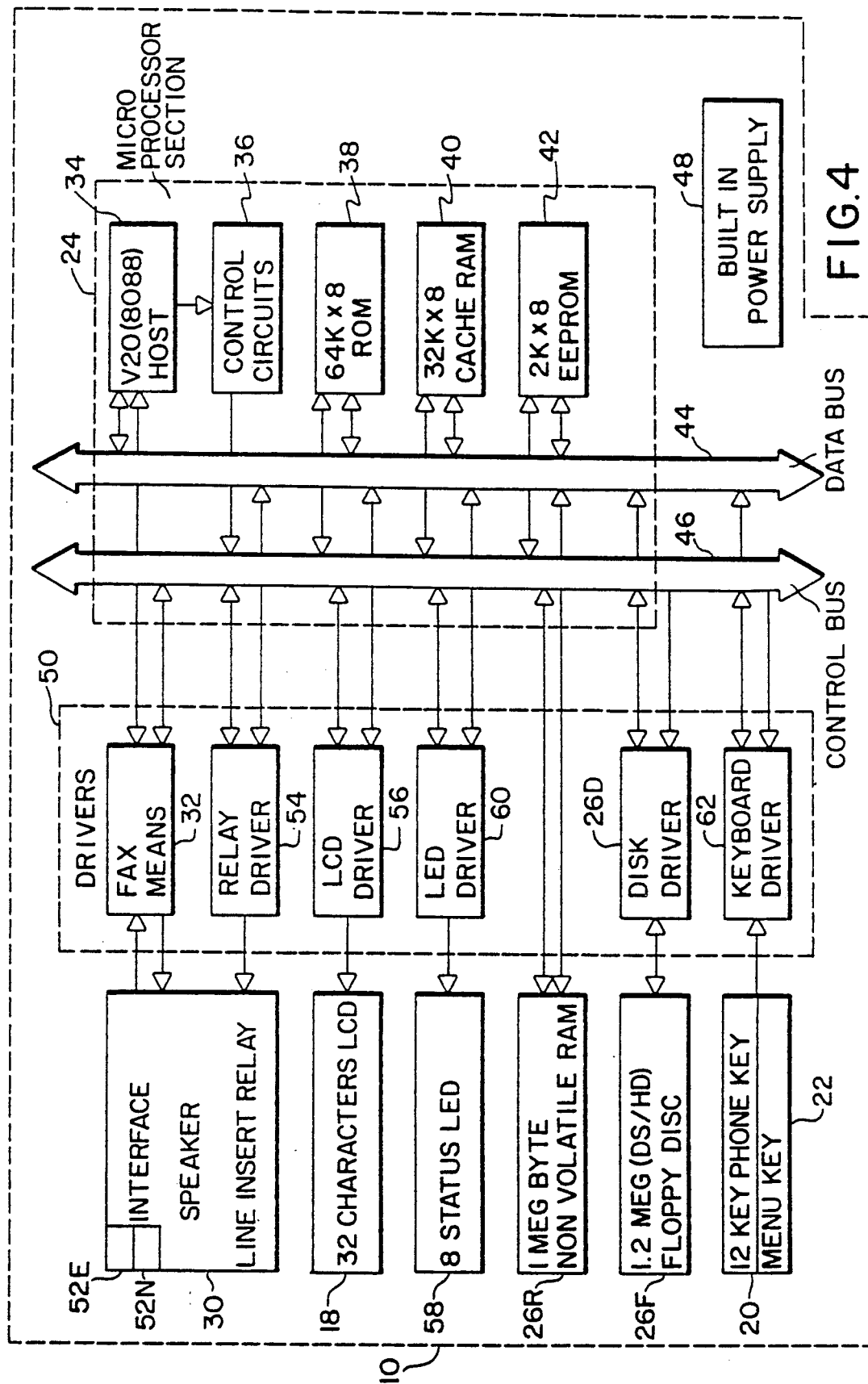
FIG. 4 shows a more detailed diagram of the present system.

With reference now to FIG. 4, the microprocessor controller 24 includes a processing chip 34 such as an 8088, control circuits 36, a read only memory (ROM) 38, an optional cache random access memory (RAM) 40, an electrically erasable programmable read only memory (EEPROM) 42, data bus 44, and control bus 46. The specifics of the construction of microprocessor 24 need not be discussed in detail as configuring such a microprocessor is generally known in the field.

A power supply 48 is used to provide power to the microprocessor and the other components shown in FIG. 4.

A number of drivers 50 are disposed between the microprocessor 24 and various other components. The drivers 50 include the fax means or fax chip 32 which is used between the interface 30 and the microprocessor 24. As indicated in the block for interface 30, it may include an optional speaker, a line .insert relay to be discussed in more detail below, and two commonly used RJ11 jacks 52E and 52N to respectively couple the system 10 to an external phone line and to the interconnection phone line. A relay driver 54 is used to control a series of relay switches within interface 30 as will be discussed in detail below. The liquid crystal display 18 is driven by driver 56, whereas eight status LEDs 58 may be driven by driver 60 and are used to indicate the status in which the machine is disposed.

Although the optional LED display 58 and LED driver 60 might be used to provide additional information as to the status of the system 10, it is preferred that this simply be an internal arrangement whereby one may, for diagnostic purposes, read the signals on one or both of the buses 44 and 46. In such a case, the LED 58 may simply be mounted internally to the unit so that a service person may access it.

Preferably, the memory 26 of FIG. 3 is realized by a DRAM 26R of FIG. 4. However, a high end or more advanced version of the present invention may include a floppy disc storage means 26F instead, or in addition to, the RAM storage means 26R. The optional floppy disc 26F would also need a driver 26D which, like floppy disc 26F and the cache RAM 40 would be optional and need not be included in the basic design of the invention.

The 12 key phone key pad 20 and the menu key pad buttons 22 are sensed by way of a driver 62.

Figure 5:
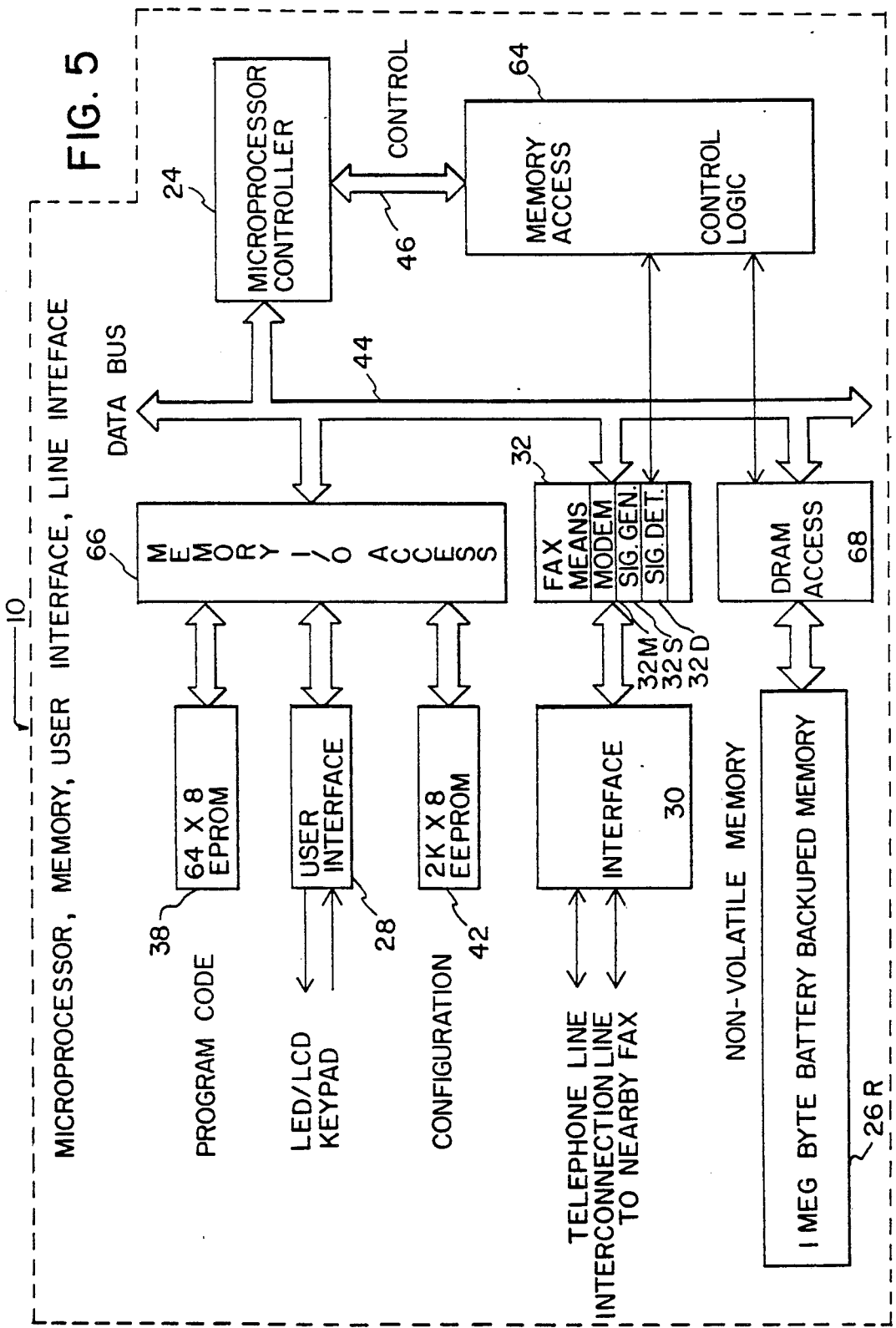
FIG. 5 shows a more detailed diagram of portions of the arrangement of FIG. 4.

As shown in FIG. 5, a memory access control logic block 64 may be used via memory I/O access block 66 in conjunction with the ROM 38, user interface 28, and EEPROM 42. Additionally, the memory access control logic 64 is connected to the fax means 32 and a DRAM access access block 68. The fax means 32 includes modem 32M, DTMF signal generator 32S, and DTMF signal detector 32D.

Figure 6:
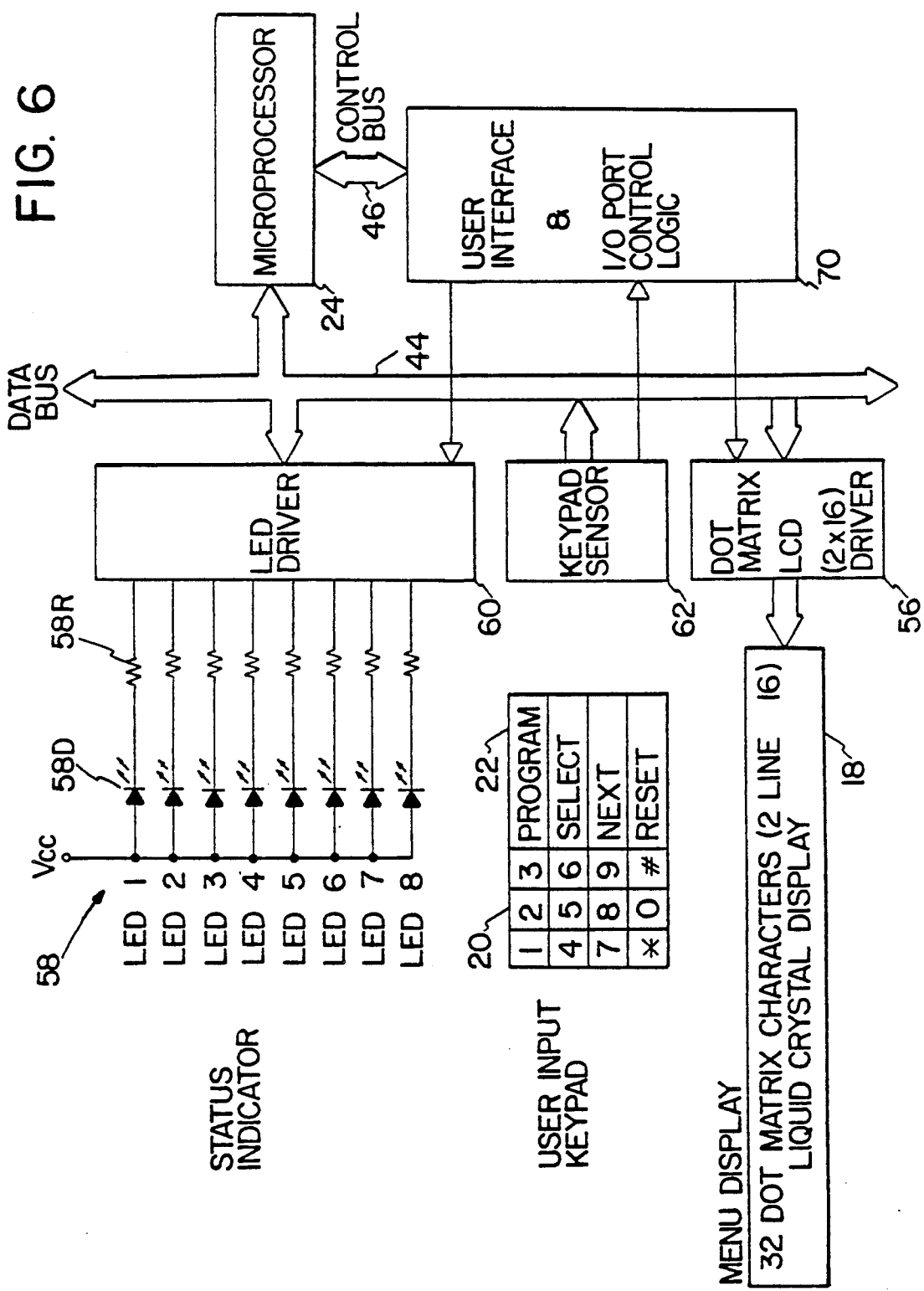
FIG. 6 shows a more detailed schematic of the user interface portion of the system.

As shown in FIG. 6, the optional LED display may include the LEDs 58D and resistors 58R. FIG. 6 also shows how the user interface and I/O port control logic block 70 connects to the LED driver 60, key pad sensor or driver 62, and LCD driver 56.

Figure 7:
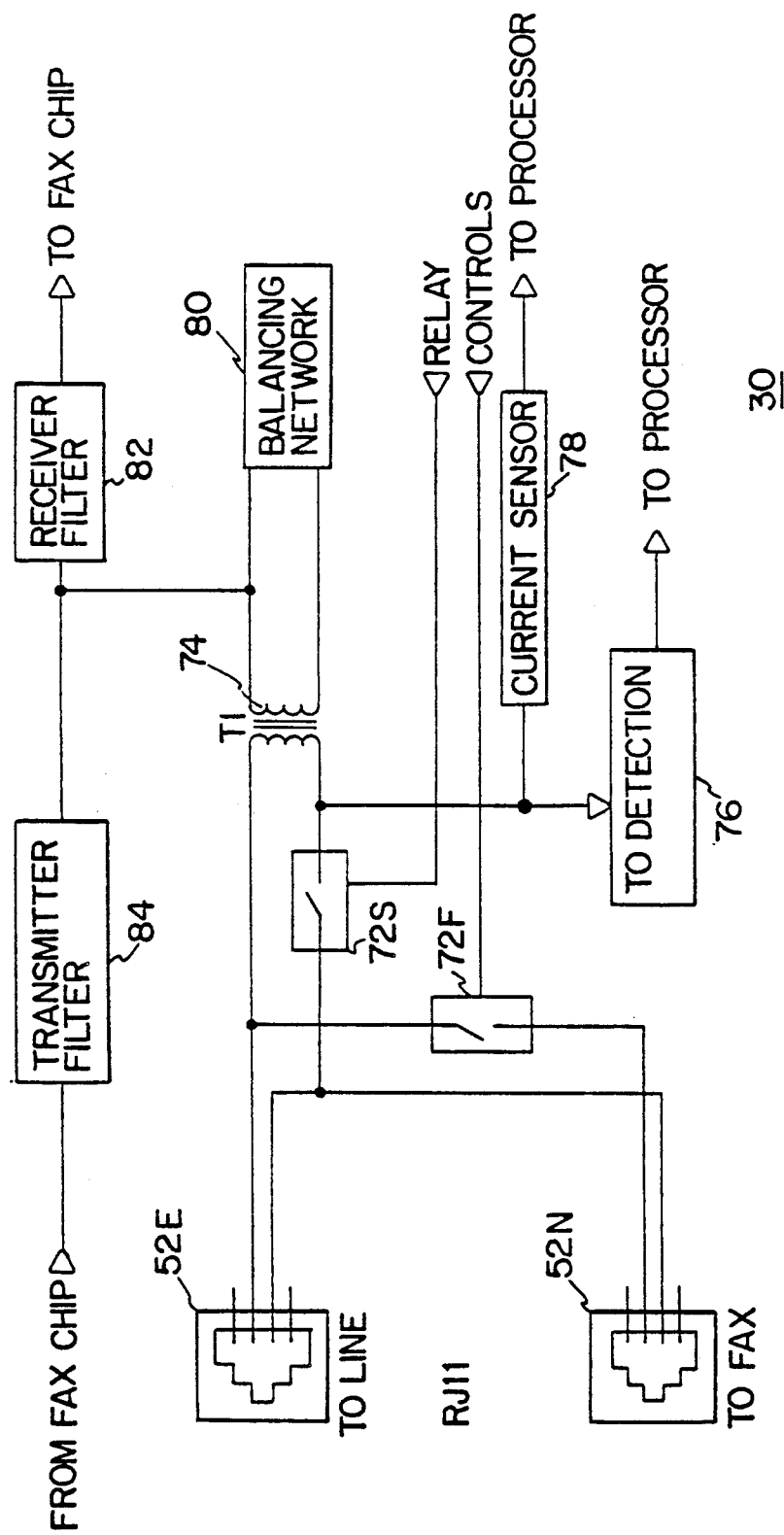
FIG. 7 shows a detailed schematic of the phone line interface arrangement.

Turning now to FIG. 7, the construction of the interface (line interface) 30 will be discussed. As shown, the two jacks 52E and 52N serve as first and second connection means respectively connectable to an external phone line and to an interconnection phone line extending from the system 10 to an external local facsimile transceiver or fax machine (phone lines and fax machine not shown in FIG. 7). The interface 30 includes switching means having first and second relays or switches 72F and 72S. Each of the switches or relays 72F and 72S are controlled switches meaning that a signal on one or more control terminals is used to control the opening and closing of electrical connection between two other terminals. Although a mechanical relay might be used, a semiconductor switch of any of various know types could also be used. Each of the control terminals of the switches would be connected to the microprocessor 24 by way of the relay driver 54 (microprocessor and relay driver are in FIG. 4 and not in FIG. 7).

When the switch 72F is closed, the external phone line (not shown) connected to jack 52E will be connected directly through to the interconnection phone line (not shown) connected to jack 52N. The second switch or relay 72S is used to connect a transformer 74 to the external phone line plugged into jack 52E. Additionally, a ring detection circuit 76 and a current sensor 78 are connected to transformer 74. Although the current sensor 78 is shown on the input side of the transformer 74, the current sensor 78 could be located in a number of different positions as will be apparent to those familiar with telephone current sensing. The ring detection circuit 76 simply detects when a telephone call is incoming to the jack 52E over the external phone line, whereas the current sensor 78 would detect when the external, local fax machine 12 (FIG. 1 only) has picked up or answered the telephone call. Attached to the transformer 74 is a balancing network 80 and a receiver filter 82. A transmitter filter 84 is connected to the same side of transformer 74. The output from the receiver filter goes to the input pin of a fax chip (not shown in FIG. 7), whereas the input to the transmitter filter 84 comes from the transmission pin or output pin of the fax chip. The fax chip is of course used to serve as the fax means 32 of FIGS. 4 and 5.

The positions of the switches or relays 72F and 72S change depending upon the mode of operation which the system 10 is in as will be discussed in detail below. Although the jacks 52E and 52N of FIGS. 4 and 7 are not shown in FIG. 2, they could be located at any convenient place on the housing 10H. Preferably, they would be located on the back of the housing. Additionally, a power switch, not shown, could be used for turning on and off the system 10.

Parameters

Before proceeding to discuss specific flow charts illustrating different aspects of the operation of the present invention, the programming of the present invention by use of the user interface 28 (of FIG. 3) and, more specifically, those portions of the user interface 28 shown in FIG. 2 including the LCD 18, key pad 20, and menu keys or buttons 22 will be discussed. The user presses the button 22 which is labeled program in order to configure the system 10. A series of parameter settings will be displayed in the 32 character LCD window 18. The select button 22 is used to step through the menu, and the next key 22 is used to select the desired input. The configuration which is established is automatically saved in the EEPROM 42 (see FIGS. 4 or 5). The configuration session is terminated by pressing the program button 22. The various configurable parameters and the default settings will now be discussed. The fax message recorder maintains a record of the receiving time and date of each document received. The time and date may be input to the system 10 by use of various known techniques. The time and date that each document was received at the system 10 will be displayed on top of the forwarded document, this being a simple variation of the standard technique whereby the time and date of reception of a document is printed on top of the received fax document. The system 10 protects the received documents from unauthorized access by use of a password which may be between one and six digits long. The default setting is 1 2 3 4 5 6, but the user should of course have this number changed.

The system 10 may be disposed in three primary modes: an off mode in which the system 10 is turned off and no documents are stored and in which switch 72F of FIG. 7 is closed such that the external phone line 14 of FIG. 1 is connected directly through to the interconnection phone line 16 of FIG. 1, a normal mode which has several sub or secondary modes discussed below, and an optional auto-answer mode also having secondary modes discussed below. In the off mode, the external local fax machine 12 simply operates as usual and the system 10 is not operating except that it may receive incoming commands as discussed below. The normal mode allows the fax machine 12 to continue to operate in its normal fashion and the system 10 records or stores all incoming fax messages and is available for an authorized person to call and request retransmission of any stored fax message. In the optional auto-answer mode, the system 10 may operate like a fax machine without producing any hard copy. Instead, it would simply answer incoming calls and store the incoming messages without regard to whether a fax machine 12 is connected to the system 10. More details of these operations will be discussed below. The default setting for the operation mode is the normal mode.

The machine can operate in either a dial tone setting or a pulse setting and the default setting is the dial tone setting. This of course relates to the type of signals which are carried over the external phone line 14. It is necessary to operate in the dial tone setting for the optional notification function to work. The notification function, discussed in more detail below, is an arrangement whereby the device or system 10 automatically calls a particular telephone number corresponding to a person's pager number when an incoming fax message is received.

A ring count parameter having a default setting of 2 is used in the optional auto-answer mode to determine the number of rings to wait before answering the call.

A command wait timer, having a default setting of three seconds, determines the amount of time to wait for a remote command.

The optional notification function has a notification enable parameter with a default setting of off. If the notification enable parameter is set on, the operator may program a notification number into the system 10. Upon receiving an incoming telephone fax message, the system 10 will automatically call the notification number and transmit a notification message. For example, this number may simply be the telephone number of a pager unit and the notification message may simply be an arbitrary series of numbers to indicate to the person that a fax message has just been received by his fax unit. When the notification enable is on, the user can input the notification number at which he is to be called as well as the notification message which is to be transmitted. There are no default settings for the notification number and notification message.

The transmit speed governs the speed at which the system 10 transmits fax messages. The default setting of 9600 baud, should be used for optimum performance except when a noisy condition requires a lower speed.

During normal operation, the current time and date will be displayed in the display window 18 as well as the number of messages stored. The stored documents may be purged with the reset button.

Remote Commands

In the previously mentioned normal mode (as well as the previously mentioned optional auto-answer mode), one of the sub modes or secondary modes is a remote access mode wherein commands may be transmitted to the system 10 by use of DTMF signals from any remote location. A correct password is necessary for the system to accept the command. The available commands are discussed below. It should be considered that the retrieve command and the send command are specific types of a more general forward command which requests the forwarding of one or more stored fax messages to a remote fax at a number supplied as part of the access procedure. The available remote commands are numbered as follows:

1. Query command format: password*1*
example: 1234*1*
comment: password is 1234, query number of documents received This command is used to query number of documents received and stored in the system 10. The system 10 responds to the query with a number of beeps to indicate the document count.

2. Retrieve command format: password*2*phone number*
example: 1234*2*4698024*
comment: password is 1234, send document to 4698024

This command requests the system 10 to forward all the stored documents to the fax machine with the given phone number. The system 10 will indicate the document number, the page number, and the time it received the message on top of each forwarded page.

3. Send command format: password*3*document number*phone number*
example: 1234*2*32*4698024*
comment password is 1234, send document number 32 to 4698024

This command requests the system 10 to forward a specific document to the fax machine with the given phone number.

4. Save command format: password*4*document number*
example: 1234*4*42*
comment: password is 1234, save document number 42 indefinitely Each document is assigned a number. The document number ranges from 1 to 65536. After the document is forwarded, the memory may be reused for other incoming documents. If the document needs to be saved for future retrieve, the owner can send this command to reserve those documents.

5. Purge command format: password*5*document number*
example: 1234*5*42*
comment: password is 1234, purge document number 42

Once the document is reserved with the save command, it will remain in memory until PURGE command or RESET command is given. Depending on its limited memory, the system 10 can store about 50 pages of documents. By reserving documents indefinitely, the system 10 may not be able to record all the incoming documents.

6. Reset command format: password*6*password*
example: 1234*6*1234*
comment: password is 1234, delete all documents from memory Reset command clears the internal memory of system 10 and all the stored documents will be lost. Since this command performs fairly drastic action, a second password is required to confirm the command.

7. Mode command format: password*7*mode*
example: 1234*7*1*
comment: password is 1234, place the system 10 in NORMAL mode. The system 10 can operate in three different modes. In OFF (0) mode, the system 10 will not record any incoming documents. In NORMAL (1) mode, the system 10 will record the incoming documents without interfering with the operation of the fax machine connected to the system 10. In optional AUTO-ANSWER (2) mode, the system 10 becomes an active component and receives all incoming documents in its memory. In such mode, the fax machine will not receive any documents.

8. Status command format: password*7*phone number*
example: 1234*8*4698024*
comment: password 1234, a status page should be sent to 4698024

Upon receiving such command, the system 10 will send a page of its status to the given phone number. The status page contains a summary of number of documents received, their status, and the operation mode of the system 10.

Should any wrong key be pressed during the remote access process, # key can be used to undo the previous key. For instance, 1234*2*4698022#4* is equivalent to 1234*2*4698024*.

Figure 8:
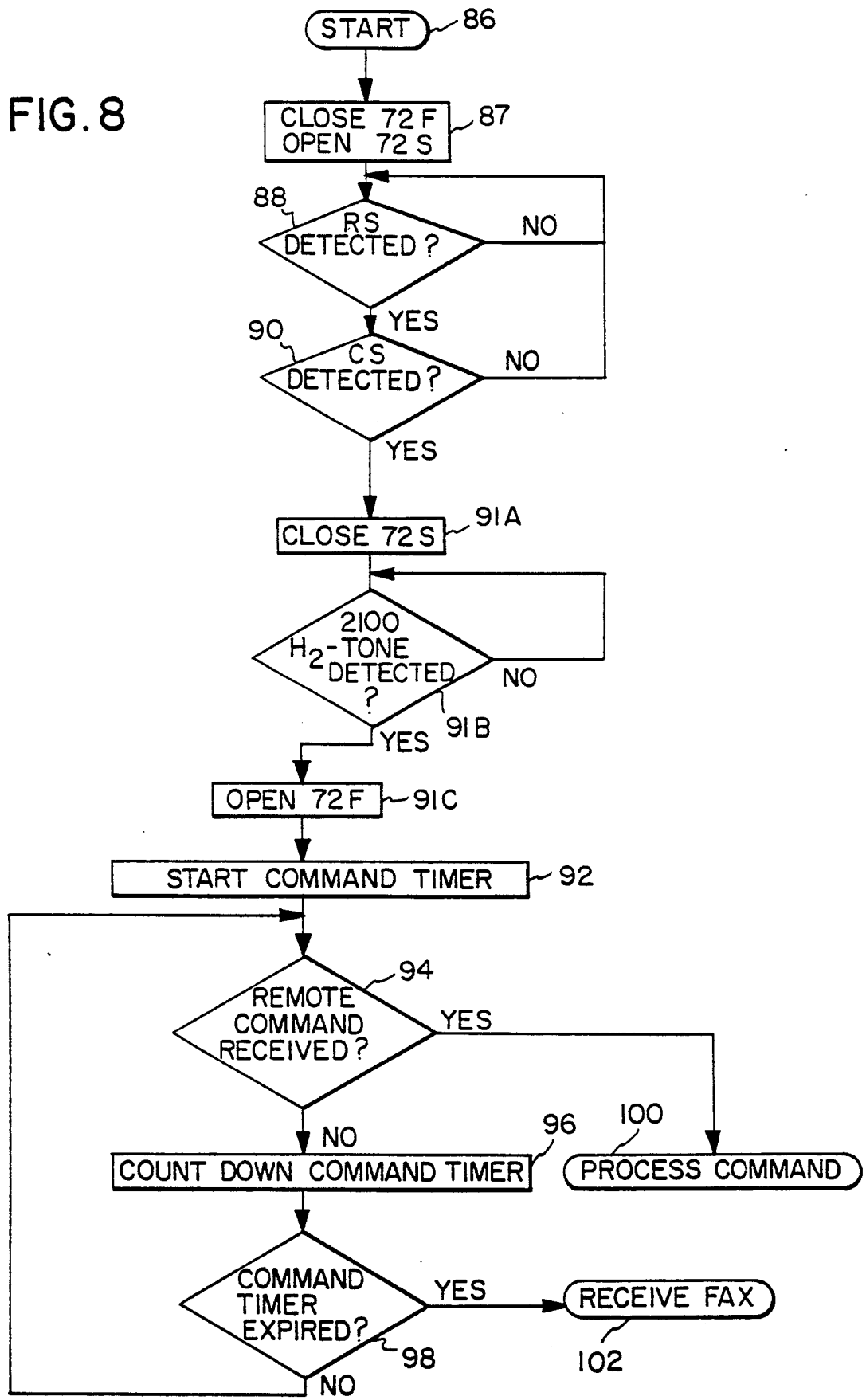
FIG. 8 shows a flow chart illustrating how the present system waits to receive an incoming fax message or an incoming command.

Turning now to FIG. 8 there is shown a simplified flow chart of the normal mode operation of the present invention or system 10. After the start block 86, control transfers to block 87 wherein the first switch 72F is closed and the second switch 72S is opened. The block 87 leads to a decision block 88 which seeks to determine if a ring signal corresponding to an incoming call has been detected. If the answer is no, the output of block 88 simply transfers control back to the beginning of block 88 and continually checks to detect a ring. Of course, the ring detection would be accomplished by ring detection circuit or device 76 of FIG. 7 which would be repeatedly questioned until a ring signal corresponding to an incoming call was detected. Upon detection of a ring, block 90 determines whether the local external fax machine has answered the telephone, this being accomplished by interrogating the current sensor 78 of FIG. 7 which operates in known fashion.

When the local fax machine picks up on the call such that the current sensor senses current, control transfers from block 90 to the block 91A which closes switch 72S. This leads to block 91B which detects the 2100 HZ tone from the local fax machine and, upon detection, control goes to block 91C for opening switch 72F. Next, the start command timer block 92 starts the command timer. From block 92, control goes to block 94 wherein the microprocessor repeatedly tests to determine if a remote command is received. The fax means 32 of FIG. 5 includes the DTMF signal generator 32S and DTMF detector 32D. The generator and detector may be an integral part of a fax chip (as by using the Yamaha YM7109) or, alternately, the DTMF signal generator and detector could be provided by separate chips. The operation of DTMF detection and generation arrangements are well known and need not be discussed in detail. If a remote command is not detected at block 94, block 96 counts down the command timer. If the command timer has not completely expired, block 98 then leads back to the beginning of block 94. If a remote command is received within the time set by the command wait timer parameter, block 94 leads to block 100 which processes the command and which will be described in more detail below in connection with FIG. 10. If the command timer expires without a command being received, the block 98 leads to the receive fax block 102 indicating that the system 10 should be prepared to receive an incoming fax message under the procedure discussed below with respect to FIG. 9. Referring back momentarily to FIG. 7, the closing of the switch 72F insures that any incoming fax message will also be received by the local fax machine 12 of FIG. 1.

Figure 9:
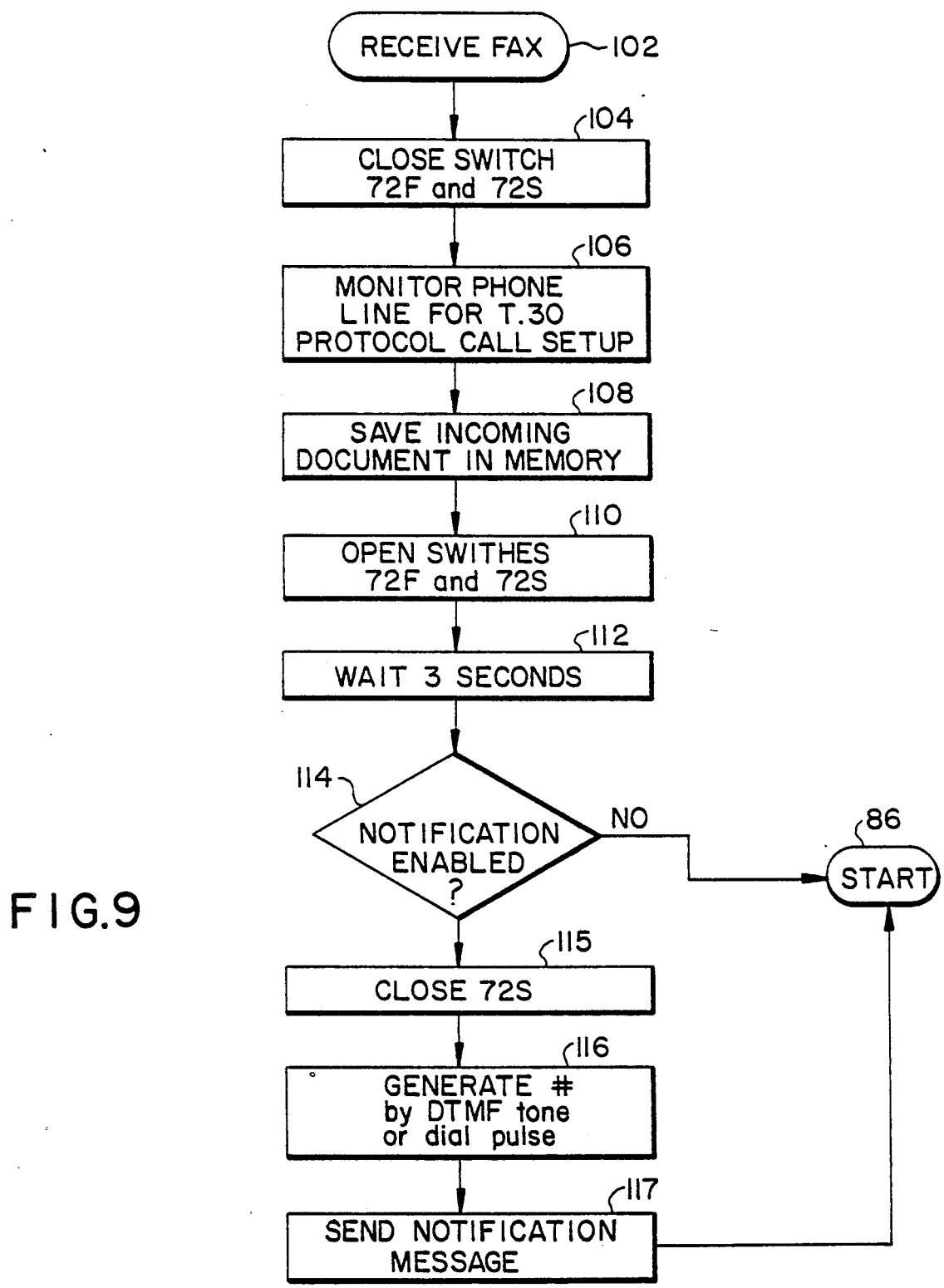
FIG. 9 is a simplified flow chart illustrating how the present invention may receive an incoming fax message.

Turning now to FIG. 9, the details of the receive fax procedure will be discussed. The receive fax block 102 from FIG. 8 leads to block 104 wherein the switches 72F and 72S are closed. As the switches should already be closed, this optional step simply double checks that the switches are in the correct position. Control then transfers to block 106 wherein the phone line is monitored by way of transformer 74 of FIG. 7. Significantly, and advantageously, the present invention normally operates without sending protocol out upon the occurrence of an incoming fax message. Instead, the transformer 74 allows the system 10 to passively observe the exchange of protocol signals between a remote fax machine and the local fax machine 12 of FIG. 1. Block 106 leads to block 108 wherein the incoming fax message is stored in the memory. With reference to FIG. 7, the incoming fax message goes through filter 82 to the fax means or chip 32 (see FIG. 4) such that the microprocessor 24 causes the storage of the incoming fax message within the RAM 26R or on a floppy disc 26F. After the block 108 has completed the storage of the document, the local fax machine 12 of FIG. 1 will have hung up the line, at which time block 108 leads to block 110 which opens the switches 72F and 72S. Block 110 leads to block 112 which waits three seconds before going to block 114 which checks to determine if the optional notification feature is enabled. If yes, block 115 closes switch 72S, block 116 generates and dials the number, and block 117 sends the notification message by using the previously mentioned DTMF generator 32S which is part of the fax means 32 of FIGS. 4 and 5. The DTMF generator or, an alternate dialing device, would dial the stored notification number after which the stored notification message would be sent. Following block 117 or block 114 if the notification is not enabled, control transfers back to block 86 which restarts the waiting for an incoming message process which is shown in FIG. 8. Of course, if the optional notification feature is not included, block 112 would simply transfer control over to block 86.

Figure 10:
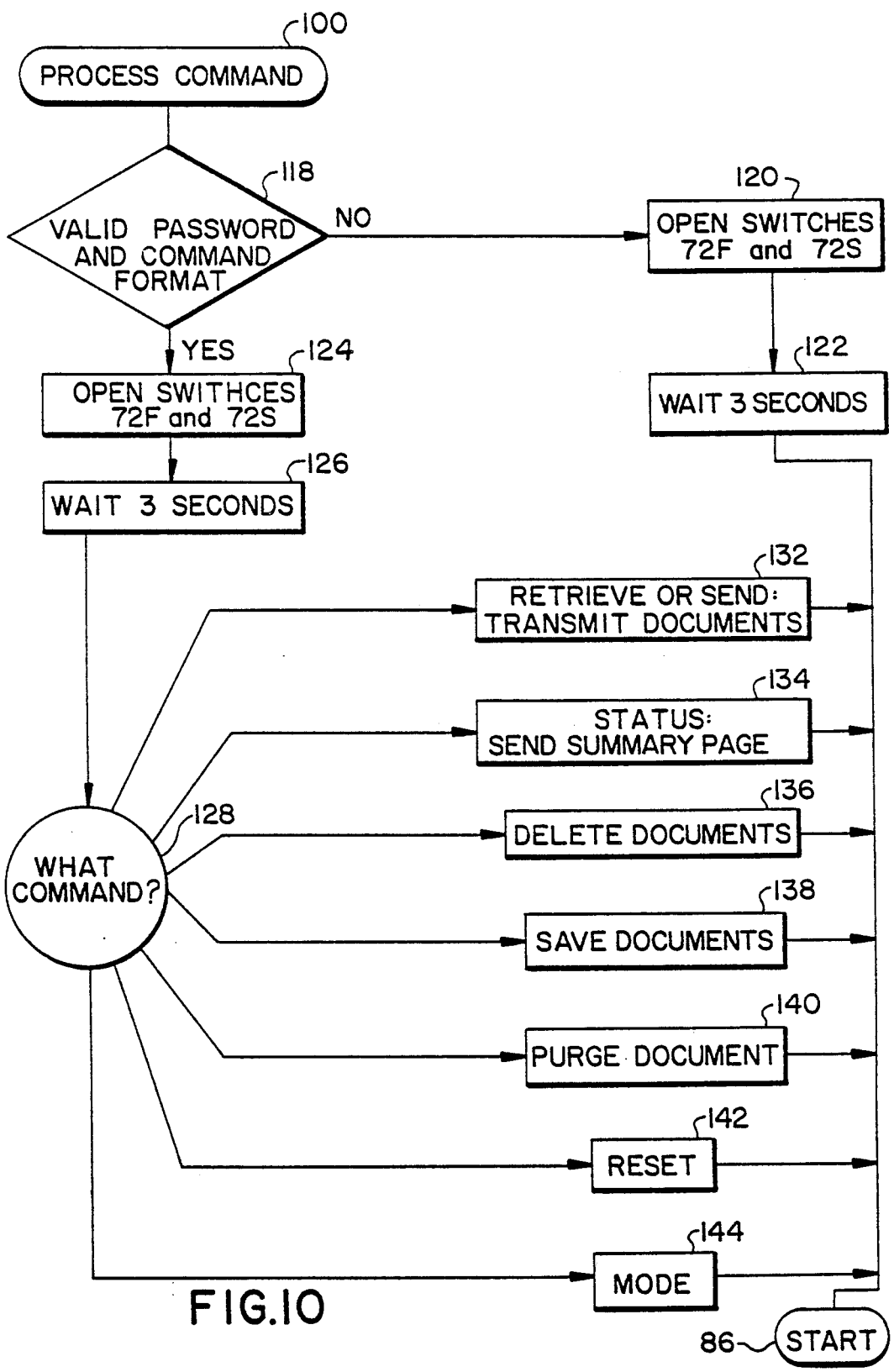
FIG. 10 is a simplified flow chart illustrating how the present invention may process a command which has been received remotely.

With reference now to FIG. 10, when the procedure of FIG. 8 leads to process command block 100, control is transferred to block 118 which looks for a valid password and command format. If the password and command format is not received, block 120 effectively hangs up the incoming line by opening the switches 72F and 72S. This then leads to block 122 which waits three seconds before returning to start block 86, which block is also shown in FIG. 8.

If the block 118 detects a valid password and command format, the microprocessor 24 stores that command and transfers control to block 124 which opens the switches 72F and 72S to insure that the system 10 has hung up on the previous call. This leads to block 126 calling for a wait of three seconds. After the three second wait established by block 126, control transfers to block 128 which directs control to one of blocks 132, 134, 136, 138, 140, 142, and 144 corresponding to the command which was remotely entered. Block 132 will be performed if the command which had been received was a retrieve or send command. When the retrieve or send command is executed by block 132, the document or documents stored in the RAM 26R of FIG. 4 (or floppy disc 26F) are transmitted over the external phone line by the microprocessor 24 causing the fax means 32 of FIG. 4 to feed the data corresponding to the images through the transformer 74 of FIG. 7 after passage through the transmitter filter 84. The transmission is discussed in more detail below with reference to FIG. 11. It will be appreciated that the system 10 in effect acts like a fax machine when it is sending the document or documents which have been stored. If the command which was entered was the status command, control transfers from block 128 to block 134 wherein a summary page is sent. In other words, the system 10 acts like a fax machine except instead of sending a stored fax message it sends a page containing a summary of the number of documents received, the status (time and date of receipt), and the mode of operation of the system 10. If the command had been entered to delete documents, control would transfer to block 136 whereupon the document or documents would be deleted. If the command had been entered to save documents, block 138 would accomplish that result. If the command was a purge command, block 140 would purge the indicated document. If the command was a reset command, block 142 would cause the resetting of the system. If the command was a mode command, block 144 would execute the mode command such that they mode could be changed. Note that even when the mode is zero or off, the system 10 may monitor the line for incoming commands such that one may remotely turn on the system 10. Control transfers from each of the blocks 132, 134, 136, 138, 140, 142 and 144 to the start block 86. Although not shown in FIG. 10, a block corresponding to the query command could be disposed between block 118 and block 124. In particular, such a block would determine if the query command had been received in which case the microprocessor 24 would control the system 10 to generate a number of beeps corresponding to the number of documents which had been received.

Figure 11:
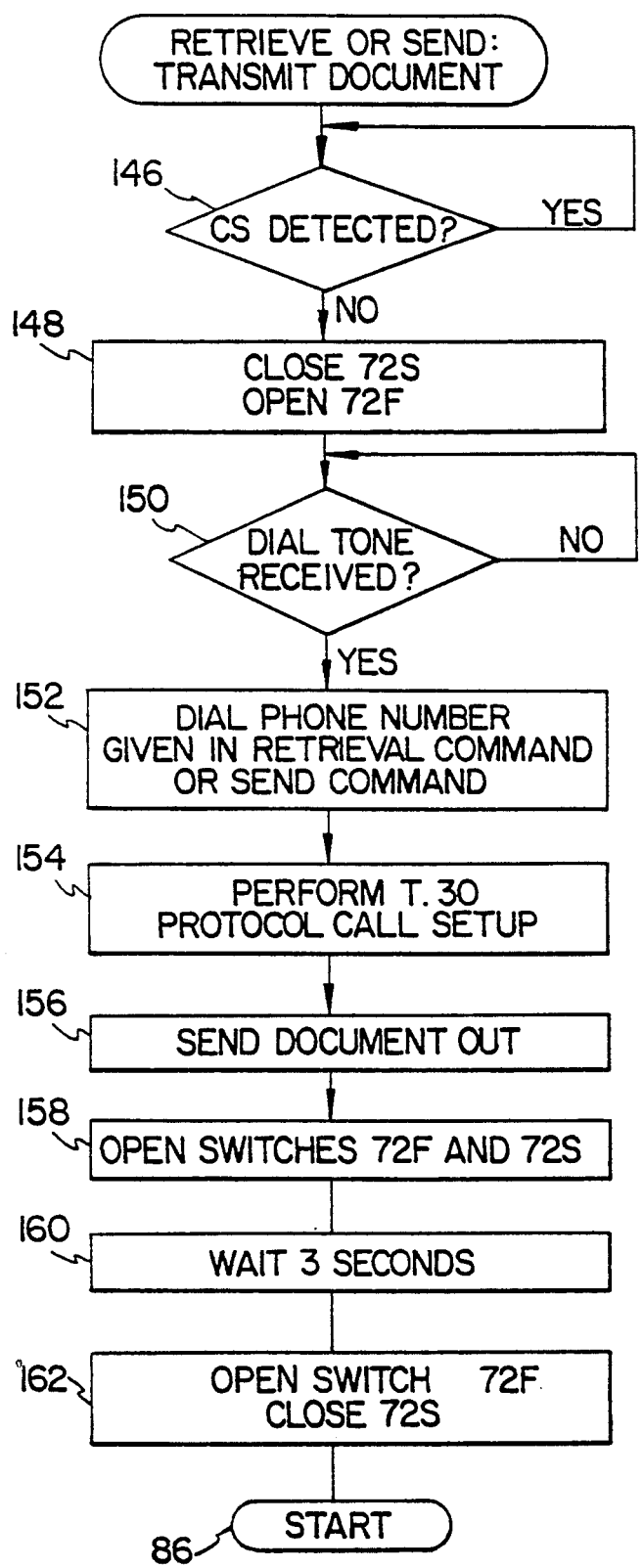
FIG. 11 shows a simplified flow chart illustrating how the present may relay a document or fax message which has previously been received.

With reference now to FIG. 11, the procedure for transmitting a document is shown starting at the transmit document block 132 which was also shown in FIG. 10. From block 132, control is transferred to block 146 which detects whether current is being sensed on the line. Upon an indication that there is no current on the line, block 146 leads to block 148 which closes switches 72S and 72T and opens switch 72F. Following block 148, block 150 looks for a dial tone. Upon receiving the dial tone, block 150 leads to block 152 wherein the microprocessor will cause the dialer part of the interface to dial the phone number which was given in the retrieve or send command. Next, block 154 performs the protocol to communicate with the remote fax machine which is at the phone number given in the retrieve or send command. Following the protocol signaling at block 154, the control goes to block 156 whereupon the document or documents is actually transmitted. Next, block 158 opens the switches 72F, 72S. Following a wait of three seconds established by block 160, block 162 opens the switches 72F and closes the switch 72S. Block 162 then returns to the start block 86.

The procedure for carrying out the status command of block 134 of FIG. 10 would be essentially similar to the process of FIG. 11 except that the system 10 would send out the status page instead of the document or documents at block 156 of FIG. 11.

As previously discussed, one of the important advantages of the present system 10 is that, in its recording mode, the local fax machine 12 (see FIG. 1) handles all the protocol with the remote fax machine and operates in the normal fashion. Under such circumstances, the fax message record/relay device or system 10 of the present invention does not serve as a terminating device. Instead, it is transparent and passive during the communication, while it simply observes and stores the fax message which is being transmitted to the fax machine 12. However, an optional feature of the system 10 might allow for an auto-answer mode wherein the fax message record/relay device 10 does serve as a terminating device. In such a mode, the interface of FIG. 7 would be changed so as to pick up an incoming phone call and store the incoming fax message. Such a mode would require that the fax chip in the system 10 transmit the protocol signals to the remote fax which is sending in the message. Although such an auto-answer mode would not realize the advantageous feature of allowing the local external fax machine 12 to operate normally, it might be advantageous under certain circumstances such as when the local fax machine 12 is broken, out of paper, or even when one is not using a local fax machine such as 12. Such an auto-answer mode does not provide the advantages of allowing the local fax machine to serve as the terminating device, but it still may provide the present invention's advantageous feature of allowing a authorized person remote access to control the telephone number to which any documents are to be forwarded. Since the auto-answer mode is not a necessary part of the present invention, the implementation of this optional feature will not be discussed in detail. It would simply be noted that the interface would include a means to answer the telephone.

Although specific constructions and designs have been disclosed herein, it is to be understood that these are for illustrative purposes only. Various modifications and adaptations will be apparent to those of skill in the art. Accordingly, the scope of the present invention should be determined by reference to the claims appended hereto.

What is claimed is:

1. A fax message recorder and relay system comprising:
    an interface with a first connection means connectable to an external phone line, a second connection means connectable to an interconnection phone line extending from said system to an external, local fax machine, a ring detector to detect an incoming telephone call on the external phone line, and a switching means;
    a fax means integral to the system and operably connected to said interface such that the fax means is operable to send and receive fax messages over the external phone line depending on the position of the switching means, said fax means operable to send fax messages over the external phone line independent of the external, local fax machine; a
    storage means operably connected to said fax means to receive and store incoming fax messages from a remote fax machine even with the local fax machine receiving the incoming fax messages; and
    a controller operably connected to said interface, said storage means, and said fax means, and wherein said controller controls said switching means to allow said storage means to store incoming fax messages sent over the external phone line and intended for the local fax machine and to allow retransmission of the incoming fax messages over the external phone line to a phone number remotely set by an authorized person independently, and after reception, of any incoming fax message.

2. The system of claim 1 wherein said system operates in a recording mode for storing incoming fax messages without sending protocol signals to a remote fax machine calling on the external phone line.

3. The system of claim 2 wherein said system operates in a recording mode for storing incoming fax messages without being a terminating device for the external phone line.

4. The system of claim 1 wherein said fax means includes a modem and an instruction detector, and wherein said controller selectively disposes said system in:
    a recording mode for storing incoming fax messages;
    a remote access mode in which an authorized person may, via remote telephone, input commands to said system including a forward command to forward stored fax messages to a remote fax at a number supplied by the authorized person via the remote telephone; and
    a forwarding mode in which the system forwards stored fax messages to a remote fax at a number supplied during the remote access mode.

5. The system of claim 4 wherein said system further comprises dialing means and wherein said controller further selectively disposes said system in:
    a notification mode wherein said dialing means generates an outgoing call with a coded signal on the external phone line whenever an incoming fax message is stored, said coded signal notifying an authorized person, via the external phone line, that a fax has been received at the external, local fax machine.

6. The system of claim 4 wherein said switching means includes a first switch having a closed position in which said first connection means and said second connection means are connected such that signals may freely travel between the external phone line and the interconnection phone line and an open position in which said first switch blocks signals on the external phone line from reaching the interconnection phone line.

7. The system of claim 6 wherein said switching means includes a second switch having a closed position in which said fax means is operably connected to said external phone line and an open position in which said fax means is disconnected from said external phone line.

8. The system of claim 7 wherein said commands are DTMF signals.

9. A fax message recorder and relay system comprising:
    an interface with a first connection means connectable to an external phone line, a second connection means connectable to an interconnection phone line extending from said system to an external, local fax machine, a ring detector to detect an incoming telephone call on the external phone line, and a switching means;

a fax means integral to the system and operably connected to said interface such that the fax means is operable to send and receive fax messages over the external phone line depending on the position of the switching means, said system operable in a recording mode for storing incoming fax messages without said fax means sending protocol signals to a remote fax machine calling on said external phone line and with the local fax machine sending protocol signals to the remote fax machine by way of said interface and said external phone line;

a storage means operably connected to said fax means to receive and store incoming fax messages from a remote fax machine even with the local fax machine receiving messages; and a controller operably connected to said interface, said storage means, and said fax means, and wherein said controller controls said switching means to allow said storage means to store incoming fax message sent over the external phone line and intended for the local fax machine and to allow retransmission of the incoming fax messages over the external phone line to a phone number set by an authorized person.

10. The system of claim 9 wherein said system operates in the recording mode without being a terminating device for the external phone line.

11. The system of claim 10 wherein said fax means include a modem and an instruction detector, and wherein said controller selectively disposes said system in:

the recording mode for storing incoming fax messages;

a remote access mode in which an authorized person may, via remote telephone, input commands to said system including a forward command to forward stored fax messages to a remote fax at a number supplied by the authorized person via the remote telephone;

a forwarding mode in which the system forwards stored fax messages to a remote fax at a number supplied during the remote access mode;

and wherein said remote access mode allows forward commands to be made independent of any incoming fax message.

12. The system of claim 11 wherein said switching means includes a first switch having a closed position in which said first connection means and said second connection means are connected such that signals may freely travel between the external phone line and the interconnection phone line and an open position in which said first switch blocks signals on the external phone line from reaching the interconnection phone line; and wherein said switching means includes a second switch having a closed position in which said fax means is operably connected to said external phone line and an open position in which said fax means is disconnected from said external phone line.

13. A fax message recorder and relay system comprising:

an interface with a first connection means connectable to an external phone line, a second connection means connectable to an interconnection phone line extending from said system to an external, local fax machine, a ring detector to detect an incoming telephone call on the external phone line, and switching means;

a fax means integral to the system operably connected to said interface such that the fax means is operable to send and receive fax messages over the external phone line depending on the position of the switching means;

a storage means operably connected to said fax means to receive and store incoming fax messages from a remote fax machine even with the local fax machine receiving messages; and a controller operably connected to said interface, said storage means, and said fax means, and wherein said controller controls said switching means to allow said storage means to store incoming fax messages sent over the external phone line and intended for the local fax machine and to allow retransmission of the incoming fax messages over the external phone line to a phone number set by an authorized person, and wherein said system operates in a recording mode for storing incoming fax messages without serving as a terminating system for the external phone line.

14. The system of claim 13 wherein said controller allows retransmission of the incoming fax messages over the external phone line to a phone number remotely set by an authorized person independently, and after reception, of any incoming fax message.

15. The system of claim 14 wherein said fax means includes a modem and an instruction detector, and wherein said controller selectively disposes said system in:

the recording mode for storing incoming fax messages;

a remote access mode in which an authorized person may, via remote telephone, input commands to said system including a forward command to forward stored fax messages to a remote fax at a number supplied by the authorized person via the remote telephone; and a forwarding mode in which the system forwards stored fax messages to a remote fax at a number supplied during the remote access mode.

16. The system of claim 15 wherein said system operates in a recording mode for storing incoming fax messages without sending protocol signals to a remote fax machine calling on the external phone line.

17. The system of claim 16 wherein said controller further selectively disposes said system in:

a notification mode wherein the system generates an outgoing call with a coded signal whenever an incoming fax message is stored, said coded signal notifying an authorized person, via the external phone line, that a fax has been received at the external, local fax machine; and wherein the commands are DTMF signals.

18. The system of claim 14 further comprising a housing in which said system is disposed and wherein said first and second interconnection means are jacks mounted to the housing.

19. A method of receiving fax messages by using a fax message recorder and relay system having:

an interface with a first connection means connectable to an external phone line, a second connection means connectable to an interconnection phone line extending from said system to an external, local fax machine, a ring detector to detect an incoming telephone call on the external phone line, and switching means;

a fax means integral to the system operably connected to said interface such that the fax means is operable to send and receive fax messages over the external phone line depending on the position of the switching means;

a storage means operably connected to said fax means to receive and store incoming fax messages from a remote fax machine even with the local fax machine receiving messages; and a controller operably connected to said interface, said storage means, and said fax means;

comprising steps of:

storing in said storage means incoming fax messages sent to the local fax machine;

calling the phone number of the external, local fax machine from a remote telephone and sending, independent of any received fax message, a forward command to direct said system to forward fax messages to a remote location remotely set with said forward command; and receiving fax messages at the remote location set when the forward command was sent.

20. The method of claim 19 wherein the local fax machine answers incoming fax messages, thus serving as a terminating device.

* * * * *